United States Patent [19]

Grimes

[11] 3,814,352

[45] June 4, 1974

[54] REVERSING COMMAND MODIFIER

[75] Inventor: Alton O. Grimes, Ft. Lauderdale, Fla.

[73] Assignee: The Bendix Corporation, Southfield, Mich.

[22] Filed: Apr. 17, 1973

[21] Appl. No.: 351,897

[52] U.S. Cl........... 244/77 B, 235/150.26, 235/183, 307/228, 328/127, 328/128
[51] Int. Cl............................................. B64c 13/18
[58] Field of Search.......... 235/150.26, 150.27, 183; 244/77 R, 77 A, 77 B, 77 C; 307/228-229; 328/127-128

[56] References Cited
UNITED STATES PATENTS

| | | | |
|---|---|---|---|
| 3,256,426 | 6/1966 | Roth et al. | 328/127 X |
| 3,339,088 | 8/1967 | Dillard | 328/128 X |
| 3,405,286 | 10/1968 | Mudie | 328/128 X |
| 3,535,555 | 10/1970 | Heimer | 307/228 X |
| 3,631,352 | 12/1971 | Kelley et al. | 328/127 X |
| 3,743,951 | 7/1973 | Carroll | 328/127 X |

*Primary Examiner*—Trygve M. Blix
*Assistant Examiner*—Stephen G. Kunin
*Attorney, Agent, or Firm*—W. G. Christoforo; Bruce L. Lamb

[57] ABSTRACT

A reversing command modifier circuit for a composite beam and course steering command in an aircraft flight controller uses two operational amplifiers to prevent abrupt command signal changes from causing abrupt aircraft maneuvers and additionally allows the composite command signal to be inverted in polarity when desired. A first operational amplifier operates as a current supply in response to an input composite beam and course command signal for an integrating circuit which includes the second operational amplifier. The results of the integration comprise an output command signal which can be applied to position the aircraft control surfaces. A negative feedback loop turns off the constant current supply when the output command signal attains a predetermined value. In addition, a switching circuit permits the input composite command signal to be switched at the input of the first operational amplifier thereby reversing the polarity of the output command signal.

3 Claims, 1 Drawing Figure

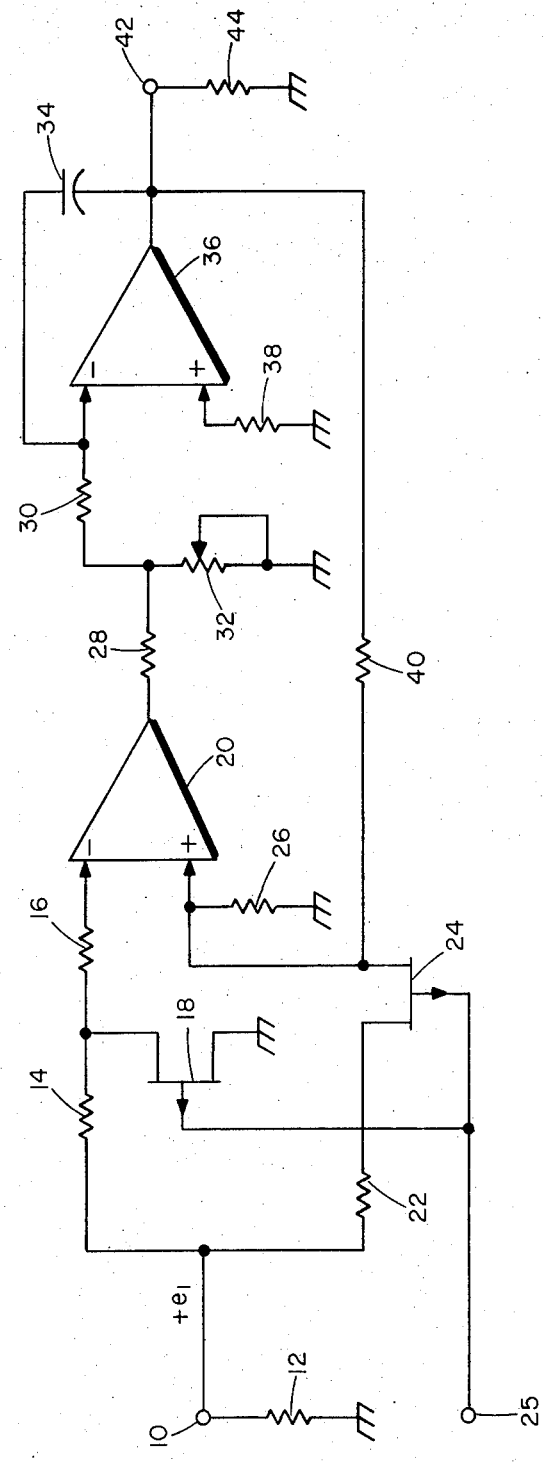

3,814,352

REVERSING COMMAND MODIFIER

BACKGROUND OF THE INVENTION

This invention relates to electronic control circuitry for aircraft automatic flight control systems and more particularly relates to reversing command modifier circuits which use operational amplifiers.

Aircraft automatic flight control systems include circuits which detect the position of the aircraft with respect to a desired aircraft track such as a localizer beam and which generate command signals which are used by application to the aircraft control surfaces to place the aircraft and maintain it on the desired track. These control signals might include beam and course command signals which are combined to produce a composite command signal which is related to the course the aircraft is desired to take and the deviation of the aircraft from a certain radio beam which coincides or is otherwise related to the desired course.

If the composite command signals were connected to directly drive the aircraft control surfaces, sudden changes in the course command signal such as might occur when the pilot changes his desired course would result in abrupt movement of the aircraft control surfaces with resultant abrupt and possibly dangerous aircraft maneuvers. It is thus preferrable that a composite command signal be modified before it is applied to position the aircraft control surfaces. This invention provides a new means for modifying the composite command signal using operational amplifiers and additionally provides means for inverting the polarity of the command signal when a reverse course is to be flown.

It is thus an object of this invention to provide a solid state reversing command modifier for use in automatic flight control systems.

It is another object of this invention to provide a reversing command modifier which uses operational amplifiers.

The drawing is a modified schematic of an embodiment of the invention.

DESCRIPTION OF THE PREFERRED EMBODIMENT

Refer to the figure wherein a composite beam and course command signal which is to be modified and whose polarity is to be selectably chosen is impressed at terminal 10 across resistor 12, which is connected between the terminal and ground. The source of the composite signal is not shown, however, the means for producing such a signal are well known to those skilled in the art and need not be explained here. The composite signal at terminal 10 is either impressed through resistors 14 and 16 to the inverting input terminal of an operational amplifier 20 or through resistor 22 and the source-drain circuit of field effect transistor 24 to the non-inverting terminal of the same operational amplifier. A second field effect transistor 18 has a source-drain circuit connected between the junction of resistors 14 and 16 and ground and has its gate electrode connected in common with the gate electrode of field effect transistor 24 and terminal 25. A two state switching signal is selectably applied at terminal 25, a first state of the switching signal rendering the source-drain circuit across transistors 18 and 24 conductive and a second state of the switching signal rendering the same circuit non-conductive. Assuming first that the switching signal is in its second state so that the source-drain circuits of the various transistors are non-conductive, the non-inverting terminal of operational amplifier 20 is initially grounded since it is connected to ground through resistor 26 and through the serial connection of resistors 40 and 44. The composite command signal in this instance is coupled through resistors 14 and 16 to the inverting input terminal of operational amplifier 20.

The output terminal of operational amplifier 20 is connected through resistors 28 and 30 to the inverting input terminal of operational amplifier 36, whose non-inverting terminal is referenced to ground through resistor 38. A capacitor 34 is connected in feedback relationship between the output terminal 42 of operational amplifier 36 and its inverting input terminal thereby connecting this latter operational amplifier as an integrator. An adjustable resistor 32 connects the junction of resistors 28 and 30 to ground. A feedback resistor 40 connects circuit output terminal 42 with the non-inverting input terminal of operational amplifier 20.

Returning again to operational amplifier 20, with the command signal $+e_1$ applied to the inverting input terminal thereof and with the non-inverting terminal grounded, the operational amplifier inverts the input signal. Operational amplifier 20 saturates and thus operates as a current source for the integrator comprised of operational amplifier 36. The rate of integration depends on the setting of resistor 32 and the values of resistor 30 and capacitor 34. Accordingly, the voltage at output terminal 42 ramps upward until a signal $+e_2$ is generated across resistor 44, where $e_2 = e_1(R_{40}/R_{14} + R_{16})$, due to the feedback arrangement of resistor 40. At that time, the current source is turned off so that integration ceases.

Assume now that the switching signal is in its first state so that transistors 18 and 24 are conductive across the source-drain circuits. The inverting input terminal of operational amplifier 20 is thus grounded through resistor 16 and transistor 18 while the command signal of terminal 10 is applied through resistor 22 and transistor 24 to the non-inverting terminal. Operational amplifier 20 in this case becomes a source of current for the integrator comprised of operational amplifier 36, with the rate of integration in like manner depending upon the setting of resistor 32 and the values of resistor 30 and capacitor 34. The modified command voltage at terminal 42 now ramps downward until a voltage $-e_3$ is attained where:

$$e_3 = -e_1(R_{40}/R_{22})$$

At that time a virtual ground appears at the non-inverting input terminal of operational amplifier 20 so that the current source turns off and the integration ceases.

It can be seen that the absolute values of $e_2$ and $e_3$ will be the same but reversed in sign if the value of resistor 22 is equal to the sum of the values of resistors 14 and 16. Of course, if it is not desired that the absolute values of $e_2$ and $e_3$ be the same, the desired ratio of these values may be quite simply chosen within the limits of the circuitry by choosing the values of the various resistors 14, 16, 22 and 40.

The invention claimed is:

1. A reversing command modifier circuit for delaying the application of a command signal from a first source of said command signal to means for positioning the control surfaces of an aircraft and for selectably determining the polarity of the command signal as delayed, comprising:

a first operational amplifier having inverting and non-inverting input terminals and an output terminal;

a first resistive means for connecting said first source to said first operational amplifier inverting input terminal;

second resistive means for connecting said first source to said first operational amplifier non-inverting input terminal;

a second source of a relatively constant potential level;

switching means for interrupting said second resistor means whereby said first source is disconnected from said non-inverting input terminal and for simultaneously referring said non-inverting input terminal to said relatively constant potential level when said switching means is in a first state and for interrupting said first resistive means whereby said first source is disconnected from said inverting input terminal and for simultaneously referring said inverting input terminal to said relatively constant potential level when said switching means is in a second state;

a second operational amplifier having an inverting input terminal, a non-inverting input terminal referenced to said relatively constant potential level and an output terminal;

capacitor means connected between said second operational amplifier inverting input terminal and output terminal;

third resistive means connecting said first operational amplifier output terminal and said second operational amplifier inverting input terminal;

fourth resistive means connecting a point in said third resistive means with said relatively constant potential level; and, feedback resistance means connecting said second operational amplifier output terminal with said first operational amplifier non-inverting input terminal.

2. The reversing command modifier of claim 1 wherein the resistance of said first resistance means is approximately equal to the resistance of said second resistance means.

3. The reversing command modifier of claim 1 wherein said switching means comprises a first field effect transistor having a source-drain circuit connected between a point in said first resistive means and said relatively constant potential level and having a first gate electrode, and a second field effect transistor having a source-drain circuit connected in said second resistive means and having a second gate electrode, said first and second gate electrodes being connected in common.

* * * * *